(12) United States Patent
Fu

(10) Patent No.: US 11,935,000 B2
(45) Date of Patent: Mar. 19, 2024

(54) METHODS AND INTERNET OF THINGS SYSTEMS FOR LNG MANAGEMENT LINKED WITH WAREHOUSING, TRANSPORTATION, AND SMART TERMINALS

(71) Applicant: CHENGDU PUHUIDAO SMART ENERGY TECHNOLOGY CO., LTD., Sichuan (CN)

(72) Inventor: Lin Fu, Chengdu (CN)

(73) Assignee: CHENGDU PUHUIDAO SMART ENERGY TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/324,144

(22) Filed: May 25, 2023

(65) Prior Publication Data
US 2023/0385763 A1    Nov. 30, 2023

(30) Foreign Application Priority Data

May 25, 2022    (CN) .......................... 202210573047.1
Apr. 17, 2023    (CN) .......................... 202310411244.8

(51) Int. Cl.
*G06Q 10/087*    (2023.01)
*G16Y 10/35*    (2020.01)
*G06F 30/18*    (2020.01)

(52) U.S. Cl.
CPC ............ *G06Q 10/087* (2013.01); *G16Y 10/35* (2020.01)

(58) Field of Classification Search
CPC ............................. G06Q 10/087; G16Y 10/35
See application file for complete search history.

(56) References Cited

FOREIGN PATENT DOCUMENTS

| AU | 2013305604 A1 | 3/2015 |
| CN | 102467121 A | 5/2012 |
| | (Continued) | |

OTHER PUBLICATIONS

First Office Action in Chinese Application No. 202210573047.1 dated Jun. 30, 2022, 34 pages.
(Continued)

*Primary Examiner* — Luna Champagne
(74) *Attorney, Agent, or Firm* — METIS IP LLC

(57) ABSTRACT

The present disclosure discloses a method and an Internet of Things system for liquefied natural gas (LNG) management linked with warehousing, transportation, and a smart terminal. The method includes: collecting data including LNG warehousing data, transportation data, and smart terminal data, and transmitting the data to a management platform through a communication network; storing all received data in a corresponding server database after preprocessing, and managing the server database through a virtualization technology; monitoring an LNG usage situation, a warehousing situation, and a transportation situation in real-time through the management platform, and displaying information corresponding to a user permission in a user platform; sending control information of LNG usage requirements, fee payments, procurement management, and transportation deployment by users through the user platform, and sending the control information to the warehousing station, the transportation vehicle, and the smart terminal through the management platform to realize real-time LNG management.

8 Claims, 6 Drawing Sheets

(56) References Cited

FOREIGN PATENT DOCUMENTS

| CN | 103595813 | A | | 2/2014 | |
|----|-----------|---|---|--------|---|
| CN | 104571064 | A | | 4/2015 | |
| CN | 106254502 | A | | 12/2016 | |
| CN | 106707928 | A | | 5/2017 | |
| CN | 108776465 | A | | 11/2018 | |
| CN | 110175788 | A | * | 8/2019 | ....... G06Q 10/06312 |
| CN | 110942200 | A | * | 3/2020 | |
| CN | 110942200 | A | | 3/2020 | |
| CN | 111432016 | A | | 7/2020 | |
| CN | 213262851 | U | | 5/2021 | |
| CN | 115203645 | A | * | 10/2022 | |
| CN | 115499459 | A | * | 12/2022 | |

OTHER PUBLICATIONS

Decision to Grant a Patent in Chinese Application No. 202210573047.1 dated Aug. 1, 2022, 9 pages.

Wang, Zizhen, et al., Software Development of Distributed ING IntelligentProduction and Supply System Based on Internet of things, Electronics World, 2021, 7 pages.

Liu, Chengsong, et al., Construction and Design of Intelligent Pipe Network Platform in Zhejiang Energy, Technology and Industry, (21): 2, 2021.

Zhang, Zhiming, Scheme Design of Inner Mongolia Zhongneng Company LNG Supply Chain Information System Platform, National Excellent Master's Dissertation Full-text Database (Information Technology Series), 2016, 55 pages.

Lyu, Haichuan, Research and construction of LNG trade information platform, Gas and Heat, 2019, 9 pages.

Huang, Jinmao et al., An IoT-supported small-scale liquefied natural gas distribution system using tank trucks in local areas, 2019 IEEE 2nd International Conference on Electronics Technology (ICET), 2019.

Xue, Liang et al., Upgrading of Jiaxing Natural Gas SCADA System Production Operation Management Platform, Shanghai Construction Technology, 2020, 4 pages.

* cited by examiner

METHODS AND INTERNET OF THINGS SYSTEMS FOR LNG MANAGEMENT LINKED WITH WAREHOUSING, TRANSPORTATION, AND SMART TERMINALS

CROSS-REFERENCE TO RELATED APPLICATIONS

This application claims priority of Chinese Patent Application No. 202210573047.1, filed on May 25, 2022, and Chinese Patent Application No. 202310411244.8, filed on Apr. 17, 2023, the entire contents of each of which is incorporated herein by reference.

TECHNICAL FIELD

The present disclosure relates to the technical field of the Internet of Things and big data, and in particular, to a method and an Internet of Things system for LNG management linked with warehousing, transportation, and a smart terminal.

BACKGROUND

According to statistics, the proportion of natural gas in domestic primary energy is increasing yearly, and the requirement for natural gas may continue to grow explosively in the next few years. While a natural gas multi-supply system continues to improve, there are still a large number of economically underdeveloped areas and areas with insufficient pipeline radiation that cannot use natural gas. However, these areas are potential markets for urban gas. Current urban construction requires establishing an efficient, safe, and economical energy supply system.

Liquefied Natural Gas (LNG) is an important part of China's natural gas market. The emergence of LNG transforms application scenarios of natural gas from relying on pipelines and pipeline transportation to application scenarios that rely on natural gas storage and transportation devices to meet the requirements of more users. Pipeline natural gas has high investment and operating costs. At present, the capacity of pipeline transportation is gradually reaching an upper limit. In such a situation, the LNG has become a main or transitional gas source for cities that are currently unable to supply gas by using pipeline natural gas, and it is also a supplementary or peak-shaving gas source for many cities that supply gas by using pipeline natural gas.

However, the current operation and management of LNG supply, transportation, and deployment are in a stage of exploration and development, lacking standardized, smart, and platform-based management. At the same time, since rural areas are of vast territory with a sparse population, user points are quite scattered, the distance between data systems is relatively long, data structures of different systems vary, and the deployment of system resources is repetitive and complicated, which may reduce system performance and make management more difficult. Moreover, the current domestic LNG transportation is given priority to road transportation. The road transportation of LNG needs to pay attention to following speed limit regulations, avoiding severe vibrations, avoiding congestions and areas with a high passenger flow, etc. However, there are inevitably some potential risks in road transportation, which may affect the safety of LNG transportation.

Therefore, it is necessary to provide a method and an Internet of Things system for LNG management linked with warehousing, transportation, and a smart terminal to realize standardized, smart, platform-based, and visualized LNG management.

SUMMARY

The purpose of the present disclosure is to overcome the deficiencies of the prior art and provide a method and an Internet of Things system for LNG management linked with warehousing, transportation, and a smart terminal.

The purpose of the present disclosure is achieved through following technical solutions.

The method for LNG management linked with warehousing, transportation, and the smart terminal includes following steps.

Step 1: collecting data including LNG warehousing data, transportation data, and smart terminal data, and transmitting the data to a management platform through a communication network.

Step 2: storing all received data in a corresponding server database after preprocessing, and managing the server database through a virtualization technology by the management platform.

Step 3: monitoring an LNG usage situation, a warehousing situation, and a transportation situation in real-time through the management platform, and displaying information corresponding to a user permission in a user platform.

Step 4: sending control information of LNG usage requirements, fee payments, procurement management, and transportation deployment by users through the user platform, and sending the control information to the warehousing station, the transportation vehicle, and the smart terminal through the management platform to realize real-time LNG management.

Further, the smart terminal monitors the LNG usage situation and uploads LNG storage information, usage information, device operation status information, and safety information through an information system loaded inside the smart terminal.

Further, the user platform includes resident users, small and micro-enterprise users, and operator users.

Further, step 2 specifically includes the following sub-steps:

Step 201: classifying the data and setting classification marks when the management platform receives the data, wherein the data is classified into perception information and control information, and the perception information includes warehousing perception information, transportation vehicle perception information, and smart terminal perception information.

Step 202: storing classified data in a cache, and storing the classified data in a master database; and obtaining a geographical location information mark included in the data of the cache at a same time, and storing the data regionally in different server slave databases according to a regional division of operators.

Step 203: reading real-time data from the cache, analyzing the real-time data, and then building a virtual pipeline network on a map by the management platform with an LNG warehousing station as a starting node, the smart terminal as a terminal node, and a transportation route of a transportation vehicle as an edge.

The Internet of Things system for LNG management linked with warehousing, transportation, and the smart terminal includes a user platform, a service platform, a comprehensive management platform, a plurality of sensor network platforms, and a plurality of object platforms; the user platform, the service platform, the comprehensive management platform, the plurality of sensor network platforms, and the plurality of object platforms are sequentially connected by communication; the sensor network platforms include warehousing sensor network platforms, transportation sensor network platforms, and smart terminal sensor network platforms; the object platforms include warehousing object platforms, transportation object platforms, and smart terminal object platforms.

The user platform is configured for various types of users to obtain perception information of user requirements through a user terminal, and to send control information through the user terminal.

The service platform is a service platform server, which communicates and connects different user platforms and the management platform through a service communication network, and provides data analysis and storage services for the user platforms and the management platform.

The management platform is configured for unified management of the LNG warehousing, the transportation, and the smart terminal, generating a virtual pipeline network by integrating LNG warehousing data, transportation data, and smart terminal data, realizing dynamic unified management on smart monitoring, deployment, and consumption of LNG energy.

Each of the sensor network platforms includes a physical entity corresponding to the each sensor network and a sensor communication information system, and communication data is analyzed and processed through the sensor communication information system.

Each of the object platforms is composed of an object physical entity and an object information system; control and perception are realized through an operation of the object information system on the object physical entity.

Further, the perception information of user requirements includes an LNG usage amount, a fee, a delivery status, a business reminder, and safety warning information.

Further, the service platform includes a perception information service sub-platform and a control information service sub-platform; the service platform analyzes and stores the perception information of user requirements obtained from the management platform through a perception information service system, and the perception information of user requirements is actively provided to users according to a type of the perception information or extracted by the users at any time according to the user requirements; the service platform receives control information of usage amount inquiries, usage requirements, and recharge payments issued by the users, and sends the control information to the management platform after being processed by a control information service system.

Further, the management platform includes a warehousing management sub-system, a transportation management sub-system, a smart terminal management sub-system, a financial management sub-system, and a procurement management sub-system.

Further, the warehousing object platforms include a smart warehousing device that obtains and uploads the storage perception information through an information system loaded inside and executes warehousing control instructions of the management platform; physical entities of the transportation object platforms are LNG transportation vehicles and transportation personnel, and transportation work deployment of the management platform is executed by uploading transportation work status information and location information; physical entities of the smart terminal object platforms are smart devices with functions of storage, vaporization, and metering at an end of the LNG virtual pipeline network, the smart devices upload the LNG storage information, the usage information, the device operation status information, and the safety information through an information system loaded inside, and execute control instructions of the management platform.

Beneficial effects of the present disclosure include: by constructing the virtual pipeline network, the present disclosure provides an adjustment direction for management and control strategies of LNG consumption, transportation, and warehousing, which reduces difficulty of LNG management, improves efficiency and accuracy of real-time LNG management, and reduces burden(s) of the database to realize standardized, smart, platform-based and visualized LNG management.

DETAILED DESCRIPTION

A brief introduction of the drawings referred to the descriptions of the embodiments is provided hereinafter. The drawings do not represent all embodiments.

As used in the present disclosure and the claims, the singular forms "a," "an," and/or "the" include plural referents unless the context clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may further include other steps or elements.

When performing the operations by steps in the embodiments of the present disclosure, the order of the steps is interchangeable if not otherwise specified, and the steps are omitted, and other steps may be included in the operation.

Figure 1:
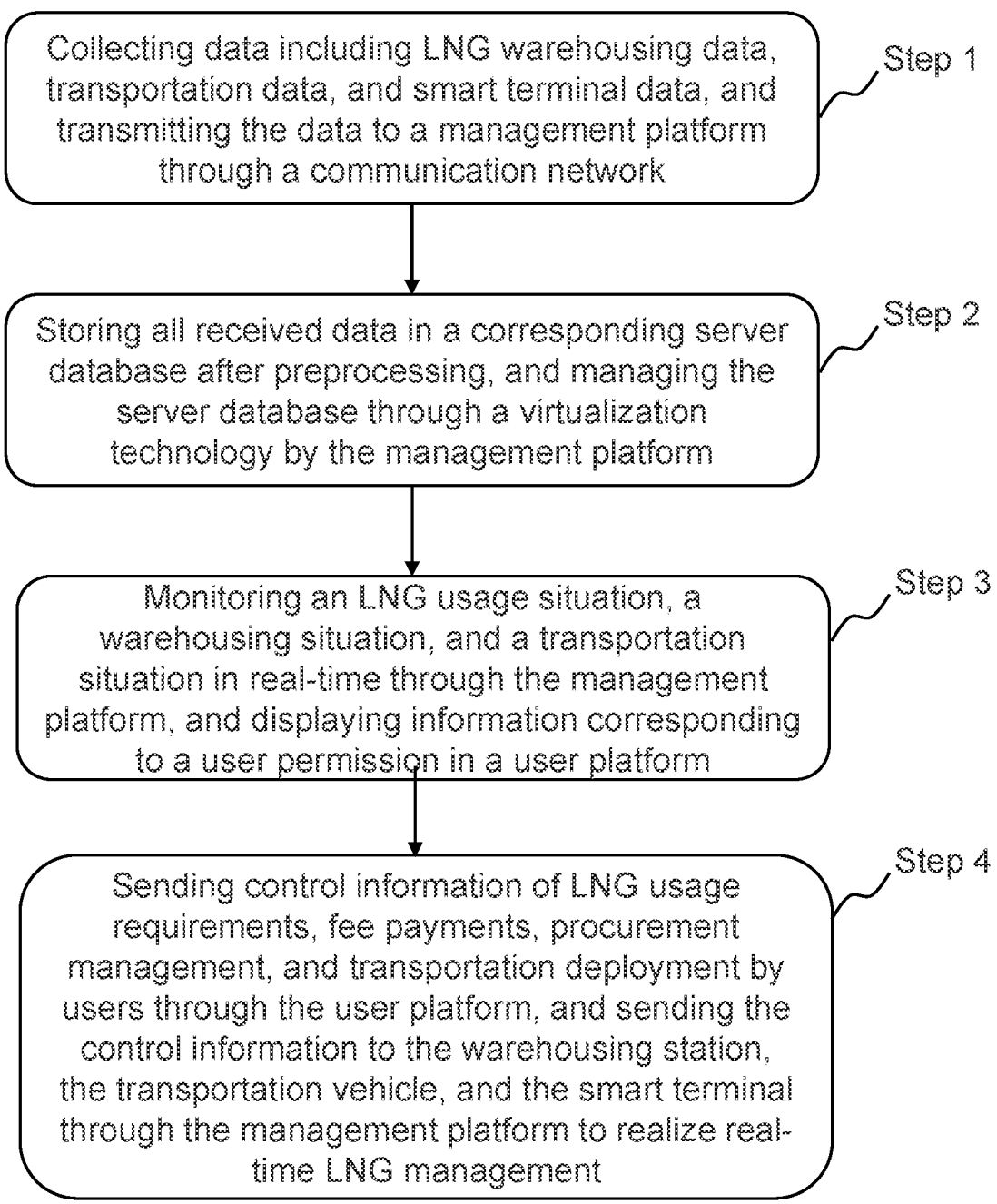
FIG. 1 is a flowchart illustrating an exemplary method for LNG management according to some embodiments of the present disclosure.

In this embodiment, as shown in FIG. 1, a method for LNG deployment management linked with warehousing, transportation, and a smart terminal includes following steps.

Step 1: collecting data including LNG warehousing data, transportation data, and smart terminal data, and transmitting the data to a management platform through a communication network.

A warehousing station refers to a device configured for storing and transporting liquid fuel. For example, the warehousing station may be a warehousing device such as a distributed energy smart warehousing tank, a tank container, etc.

In different parts of the present disclosure, warehousing data may also be referred to as a warehousing situation or warehousing station information. Detailed descriptions of the warehousing data may be found in related descriptions of the warehousing station information in FIG. 3.

The smart terminal refers to a smart device that has functions of storage, vaporization, and metering at an end of an LNG virtual pipeline network. The smart terminal data refers to relevant data of the smart terminal.

Step 2: storing all received data in a corresponding server database after preprocessing, and managing the server database through a virtualization technology by the management platform.

Preprocessing refers to preparation operation(s) before storing data. For example, the management platform may perform preprocessing such as classification and invalid information filtering on all the received data.

Step 3: monitoring an LNG usage situation, a warehousing situation, and a transportation situation in real-time through the management platform, and displaying information corresponding to a user permission in a user platform.

In some embodiments, the LNG usage situation may include information such as an LNG usage amount, an LNG usage speed, an LNG usage time, etc. In some embodiments, the transportation situation may include information such as a location of a transportation vehicle, a transportation route, a transportation time, etc. Detailed descriptions of the warehousing situation may be found in related descriptions of the warehousing station information in FIG. 3.

Step 4: sending control information of LNG usage requirements, fee payments, procurement management, and transportation deployment by users through the user platform, and sending the control information to the warehousing station, the transportation vehicle, and the smart terminal through the management platform to realize real-time LNG management.

The LNG usage requirements refer to relevant requirements of users for using the LNG. Detailed descriptions regarding the LNG usage requirements may be found in FIG. 3 and related descriptions thereof.

The transportation deployment may be realized by determining a target transportation scheme, an updated transportation scheme, etc. Descriptions regarding the target transportation scheme may be found in FIG. 3 and related descriptions thereof. Descriptions regarding the updated transportation scheme may be found in FIG. 3, FIG. 6, and the related descriptions thereof.

The smart terminal monitors the LNG usage situation and uploads LNG storage information, usage information, device operation status information, and safety information through an information system loaded inside the smart terminal.

The user platform includes resident users, small and micro-enterprise users, and operator users.

Step 2 specifically includes the following sub-steps.

Step 201: classifying the data and setting classification marks when the management platform receives the data, wherein the data is classified into perception information and control information, and the perception information includes warehousing perception information, transportation vehicle perception information, and smart terminal perception information.

The warehousing perception information may include information such as an LNG storage amount, pressure, a temperature, etc., of the warehousing station. The transportation vehicle perception information may include information such as LNG transportation amount, transportation pressure, etc. The smart terminal perception information may include information such as the LNG storage amount, the LNG usage amount, etc., of the smart terminal.

Step 202: storing classified data in a cache, and storing the classified data in a master database; and obtaining a geographical location information mark included in the data of the cache at a same time, and storing the data regionally in different server slave databases according to a regional division of operators.

Step 203: reading real-time data from the cache, analyzing the real-time data, and then building a virtual pipeline network on a map by the management platform with an LNG warehousing station as a starting node, the smart terminal as a terminal node, and a transportation route of a transportation vehicle as an edge.

For reading the real-time data, the present disclosure adopts a mode of caching, which develops easily and costs less, realizing real-time LNG management simply and quickly; at the same time, non-real-time data (historical data) is read from the database for data analysis and calculation applications, thereby improving read performance of the database and ensuring a load balance of the database.

Figure 2:
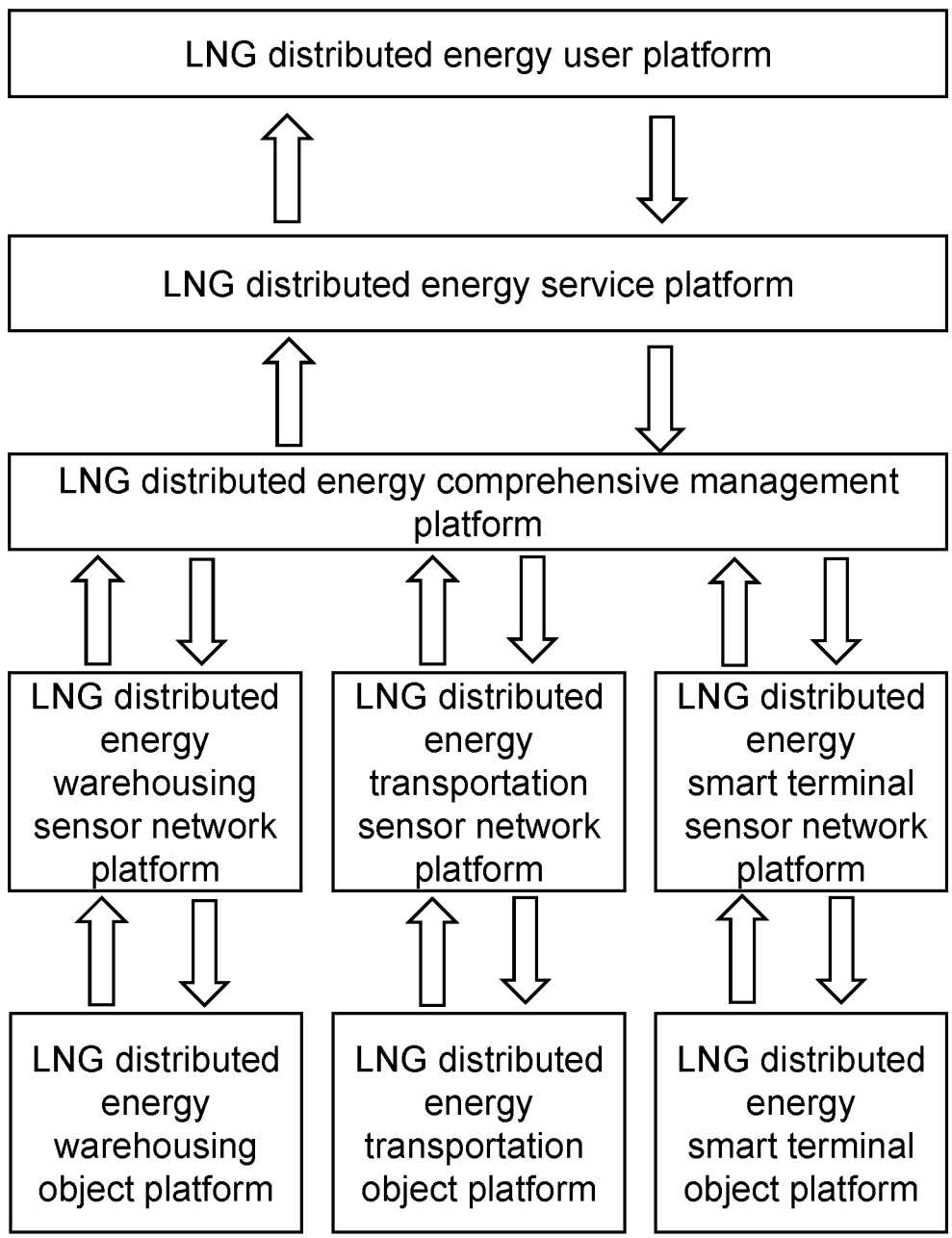
FIG. 2 is a diagram illustrating an exemplary system structure of an Internet of Things system for LNG according to some embodiments of the present disclosure.

As shown in FIG. 2, an Internet of Things system for LNG management linked with warehousing, transportation, and a smart terminal includes a user platform, a service platform, a comprehensive management platform, a plurality of sensor network platforms, and a plurality of object platforms; the user platform. The service platform, the comprehensive management platform, the plurality of sensor network platforms, and the plurality of object platforms are sequentially connected by communication. The sensor network platforms include warehousing sensor network platforms, transportation sensor network platforms, and smart terminal sensor network platforms. The object platforms include warehousing object platforms, transportation object platforms, and smart terminal object platforms. The user platform is used for various types of users to obtain the perception information of user requirements through a user terminal, and to send control information through the user terminal. The user platform includes various LNG users such as rural industrial and commercial (operator) users, rural resident users, and rural small and micro-enterprise users. The control information includes LNG usage requirements, fee payments, and user evaluation information. The perception information of the user requirements includes an LNG usage amount, a fee, a delivery status, a business reminder, and safety warning information.

The service platform is a service platform server, which communicates and connects to different user platforms and the management platform through a service communication network, and provides data analysis and data storage services for the user platforms and the management platform. The service platform includes a perception information service sub-platform and a control information service sub-platform. The service platform analyzes and stores the perception information of user requirements obtained from the management platform through a perception information service information system. The perception information of user requirements may be actively provided to users according to the type of the perception information or extracted by users at any time according to the user requirements. The service platform receives control information including usage amount inquiries, usage requirements, and recharge payments issued by users, and sends the control information to the management platform after being processed by a control information service system.

The management platform is configured for unified management of the LNG warehousing, the transportation, and the smart terminal and for integrating the LNG warehousing data, the transportation data, and the smart terminal data to realize dynamic unified management on smart monitoring, deployment, and consumption of LNG energy. The management platform is a comprehensive management platform integrating the LNG warehousing, the transportation, and the smart terminal. An information system of an LNG distributed energy comprehensive management platform (which is referred to as a comprehensive management platform hereinafter) is an LNG distributed energy comprehensive management system. The LNG distributed energy comprehensive management system includes information systems such as an LNG distributed energy warehousing management sub-system, a transportation management sub-system, a smart terminal management sub-system, a financial management sub-system, a procurement management sub-system, etc. Through these information systems, smart monitoring management of the LNG warehousing, deployment management of the LNG transportation, device and consumption management of the LNG smart terminal, financial settlement management, procurement management, etc., may be realized.

The sensor network platforms include different independent sensor network platforms corresponding to LNG distributed energy warehousing, transportation, and smart terminal, which are composed of corresponding sensor communication networks (e.g., 5G, Internet, GPS, Beidou), physical entities (e.g., sensor communication servers), and an LNG distributed energy sensor communication information system. Each of the sensor network platforms realizes a communication connection between the management platform and the object platform for perception and control through the sensor communication networks (e.g., 5G, Internet, GPS, Beidou) and the sensor communication servers, and analyzes and processes communication data through the LNG distributed energy sensor communication information system.

Each of the object platforms is composed of an object physical entity and an object information system. Control and perception are realized through the operation of the object information system on the object physical entity.

In the embodiment, the object platforms include an LNG distributed energy warehousing object platform, an LNG distributed energy transportation object platform, and an LNG distributed energy smart terminal object platform. Each object platform is composed of a smart device and an object information system loaded inside. Physical entities of the LNG distributed energy warehousing object platform include warehousing devices such as an LNG distributed energy smart storage tank and a tank container, which are used to obtain and upload the warehousing perception information and execute warehousing control instructions of the management platform through an information system loaded inside. Physical entities of the LNG distributed energy transportation object platform are LNG transportation vehicles and transportation personnel, which are used to upload the transportation work status information and location information and execute the transportation work deployment of the management platform. Physical entities of the LNG distributed energy smart terminal object platform are smart devices with functions such as storage, vaporization, and metering at an end of the virtual pipeline network of the LNG, which are used to upload LNG storage information, usage information, device operation status information, safety information, etc., through the information system loaded inside and execute control instructions of the management platform.

The present disclosure integrates data of different objects by using a virtual database technology and provides an adjustment direction for management and control strategies of LNG consumption, transportation, and warehousing by constructing a virtual pipeline network, thereby reducing the difficulty of LNG management, and improving efficiency and accuracy of real-time management of the LNG, realizing standardized, smart, and platform-based management of the LNG.

Figure 3:
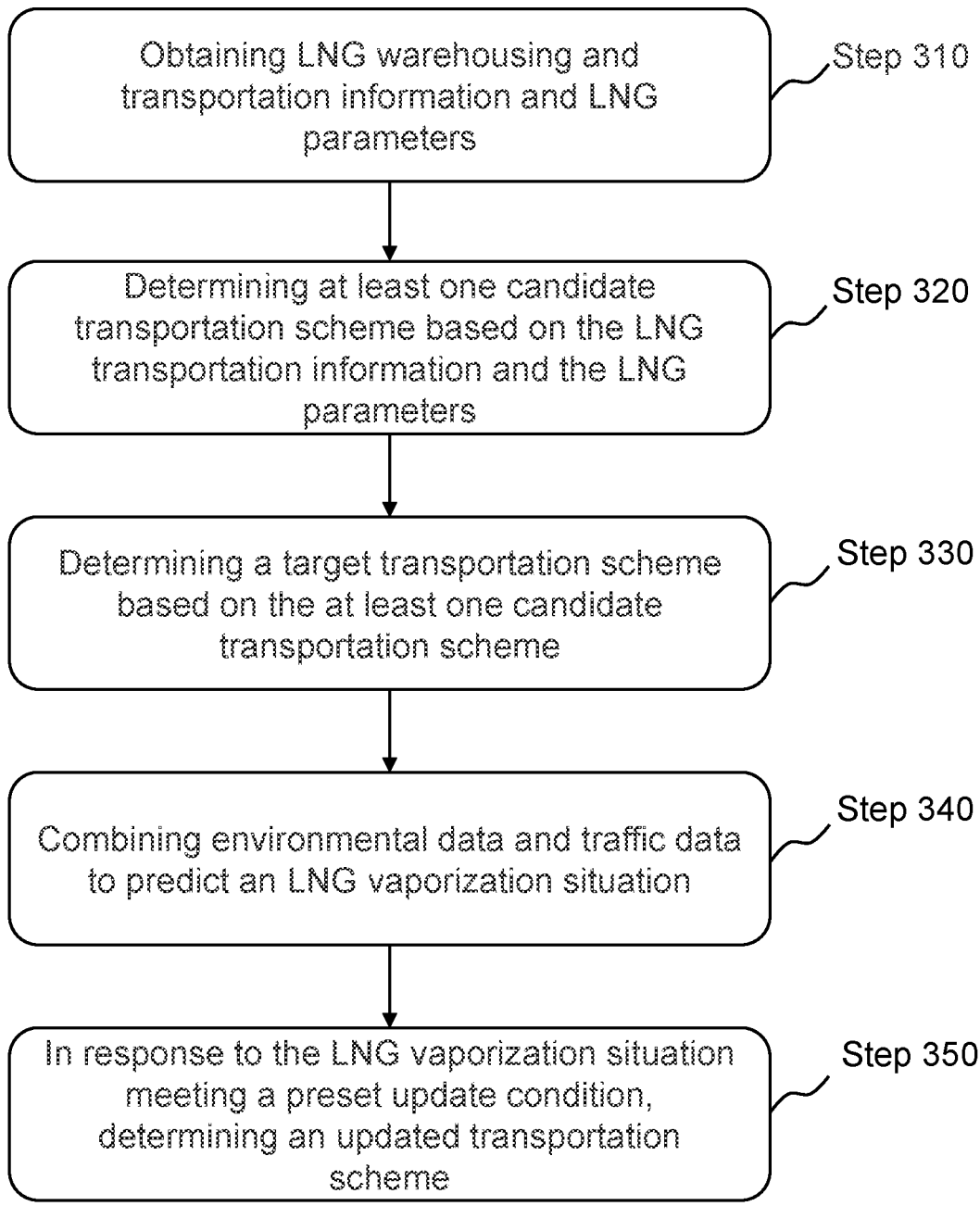
FIG. 3 is a flowchart illustrating an exemplary method for LNG warehousing and transportation according to some embodiments of the present disclosure.

FIG. 3 is a flowchart illustrating an exemplary method for LNG warehousing and transportation according to some embodiments of the present disclosure. As shown in FIG. 3, process 300 includes following steps. In some embodiments, the process 300 may be executed by a comprehensive management platform.

Step 310, obtaining LNG warehousing and transportation information and LNG parameters.

The LNG warehousing and transportation information refers to information related to LNG warehousing and transportation. In some embodiments, the LNG warehousing and transportation information may include information such as a starting point and a transit point of LNG transportation. In some embodiments, the LNG warehousing and transportation information may also include warehousing station information and location information of a smart terminal. Further descriptions regarding the LNG warehousing and transportation information and the LNG parameters may be found in the corresponding descriptions of warehousing data and transportation vehicle perception information in FIG. 1.

In some embodiments, the warehousing station information may include basic device information of a warehousing station, for example, an acreage, a usage duration, a service life, etc., of the warehousing station. In some embodiments, the warehousing station information may also include inventory information and location information.

Detailed descriptions regarding the warehousing station and the smart terminal may be found in FIG. 1 and related descriptions thereof.

In some embodiments, the comprehensive management platform may obtain the LNG warehousing and transportation information based on manual input. In some embodiments, the comprehensive management platform may also obtain the LNG warehousing and transportation information based on historical data.

The LNG parameters refer to parameters of LNG during transportation. For example, the LNG parameters may include parameters such as a transportation amount, pressure, etc.

In some embodiments, the comprehensive management platform may obtain the LNG parameters through sensor elements installed on a transportation vehicle. For example, pressure in an LNG transportation process may be obtained based on a pressure sensor.

Step 320, determining at least one candidate transportation scheme based on the LNG transportation information and the LNG parameters.

The candidate transportation scheme refers to an optional transportation scheme for transporting LNG to the smart terminal. In some embodiments, the candidate transportation scheme may include a location of the warehousing station for supplying the LNG, a required LNG transportation amount, an LNG transportation time, and a location of the smart terminal. In some embodiments, the at least one candidate transportation scheme also includes at least one candidate transportation route.

The candidate transportation route refers to a transportation route that may reach the smart terminal from a target warehousing station. Any feasible route from the target warehousing station to the smart terminal may be used as the candidate transportation route. Detailed descriptions regarding the target warehousing station may be found in the descriptions hereinafter.

The comprehensive management platform may obtain the candidate transportation schemes based on the LNG transportation information and the LNG parameters. In some embodiments, the comprehensive management platform may determine a plurality of transportation schemes based on any feasible manner. For example, the comprehensive management platform may retrieve and determine transportation scheme requirements from a preset vector database based on the LNG transportation information and the LNG parameters, and determine the candidate transportation schemes from a plurality of transportation schemes based on the transportation scheme requirements. The preset vector database may be a vector database constructed based on historical data. The transportation scheme requirements may include a maximum transportation time requirement, a minimum road condition requirement, a passenger flow requirement, etc. The comprehensive management platform may determine a transportation scheme that meets the transportation scheme requirements as the candidate transportation scheme.

In some embodiments, determining the at least one candidate transportation scheme based on the LNG transportation information and the LNG parameters further includes determining the target warehousing station for supplying the LNG based on the LNG usage requirements and the warehousing station information; and determining the at least one candidate transportation route based on location information of the target warehousing station and the location information of the smart terminal.

The LNG usage requirements refer to relevant requirements of users for using the LNG. In some embodiments, the LNG usage requirements may include a required LNG amount, an expected LNG replenishment time, a latest LNG replenishment time, etc.

The target warehousing station refers to a warehousing station for supplying LNG.

The comprehensive management platform may determine the target warehousing station based on the LNG usage requirements and the warehousing station information. In some embodiments, the comprehensive management platform may determine the warehousing station whose current storage amount meets the LNG requirement of users or has a largest current storage amount as the target warehousing station. In some embodiments, the comprehensive management platform may designate a warehousing station closest to the smart terminal as the target warehousing station based on the location information of the warehousing station. Detailed descriptions of the smart terminal may be found in FIG. 1 and related descriptions thereof.

In some embodiments, the comprehensive management platform may randomly generate the at least one candidate transportation route through a smart electronic map. In some embodiments, the comprehensive management platform may use a historical transportation route as the candidate transportation route.

By determining the target warehousing station based on the LNG usage requirements and the warehousing station information and then determining the at least one candidate transportation route based on the location information of the target warehousing station and the location information of the smart terminal, the LNG usage requirements of users may be met while selecting a reasonable candidate transportation route, thereby achieving a purpose of optimizing the candidate transportation scheme.

Step 330, determining a target transportation scheme based on the at least one candidate transportation scheme.

The target transportation scheme refers to a scheme determined and selected from the at least one candidate transportation scheme for transporting the LNG.

In some embodiments, the comprehensive management platform may select a candidate transportation scheme with a highest matching degree with the transportation scheme requirements as the target transportation scheme. For example, a matching degree between a candidate transportation scheme and different transportation scheme requirements may be determined through vector matching, different weights may be set for different transportation scheme requirements, and a result of a weighted summation may be used as an overall matching degree between the candidate transportation scheme and the transportation scheme requirements, and then the candidate transportation scheme with the highest overall matching degree is taken as the target transportation scheme. In some embodiments, the comprehensive management platform may also determine the candidate transportation scheme that meets a selection condition as the target transportation scheme. For example, the selection condition may be that the transportation time is shortest, etc.

In some embodiments, determining the target transportation scheme based on the at least one candidate transportation scheme further includes performing a pre-warning and adjustment on a transportation process. Detailed descriptions regarding performing the pre-warning and adjustment on the transportation process may be found in FIG. 4 and related descriptions thereof.

Step 340, combining environmental data and traffic data to predict an LNG vaporization situation.

The environmental data refers to data related to LNG transportation environments. For example, the environmental data may include a temperature, weather, etc.

The traffic data refers to traffic data in the LNG transportation process. For example, the traffic data may include a vehicle flow, a traffic light count, a dwell time of the transportation vehicle, etc.

The LNG vaporization situation refers to a vaporization situation of LNG during the transportation. In some embodiments, the LNG vaporization situation may include an LNG vaporization speed, a volume ratio of a vaporized part to the remaining LNG, gas pressure, etc.

In some embodiments, the LNG vaporization situation further includes an LNG vaporization amount of at least one future time point.

The at least one future time point refers to at least one future moment relative to a current moment.

The LNG vaporization amount may include a real-time LNG vaporization amount, an accumulated LNG vaporization amount, etc. The accumulated LNG vaporization amount may be an LNG vaporization amount between the current moment and the at least one future time point.

The LNG vaporization situation may be affected by a transportation situation. For example, the longer the transportation time, the larger the accumulated LNG vaporization amount. Detailed descriptions regarding the transportation situation may be found in FIG. 1 and related descriptions thereof.

The comprehensive management platform may combine the environmental data and the traffic data to predict the LNG vaporization situation. In some embodiments, the comprehensive management platform may designate a historical LNG vaporization situation as a current predicted LNG vaporization situation based on the environmental data and the traffic data. For example, the comprehensive management platform may construct a vector of current environmental data and traffic data, determine a vector of historical environmental data and traffic data with a highest similarity to the vector of current environmental data and traffic data, and designate an LNG vaporization situation corresponding to the vector of the historical environmental data and traffic data as the current predicted LNG vaporization situation.

In some embodiments, the comprehensive management platform may also obtain the LNG vaporization situation by processing the LNG parameters, the environmental data, and the traffic data using a vaporization model. Detailed descriptions regarding obtaining the LNG vaporization situation based on the vaporization model may be found in FIG. 5 and related descriptions thereof.

Step 350, in response to the LNG vaporization situation meeting a preset update condition, determining an updated transportation scheme.

The preset update condition refers to a condition preset for updating the transportation scheme. In some embodiments, the preset update condition may be that the LNG vaporization speed reaches a speed threshold, etc.

In some embodiments, the preset update condition may also include at least one of pressure reaching a pressure threshold, a pressure fluctuation range exceeding a fluctuation threshold, etc.

The pressure refers to pressure in the LNG storage device during the transportation. The pressure threshold refers to a permissible pressure threshold during the transportation. For example, the pressure threshold may be a pressure threshold required for safe LNG transportation.

Since an LNG storage device may not be completely insulated, LNG may vaporize during the transportation. As the LNG vaporization amount increases, the pressure inside the LNG storage device may increase, i.e., pressure fluctuation may occur. Correspondingly, the pressure fluctuation needs to be controlled within a reasonable range.

The fluctuation threshold refers to a threshold of the pressure fluctuation range. When the pressure fluctuation range exceeds the fluctuation threshold, it indicates that the pressure fluctuates relatively violently.

The updated transportation scheme refers to a target transportation scheme that is changed when the preset update condition is met. The updated transportation scheme may include an updated transportation route, an updated transportation time, etc.

The comprehensive management platform may determine the updated transportation scheme in response to the LNG vaporization situation meeting the preset update condition. In some embodiments, the comprehensive management platform may determine the updated transportation scheme as selecting a transportation route with a lower passenger flow or vehicle flow in response to the pressure in the LNG storage device reaching the pressure threshold. In some embodiments, the comprehensive management platform may determine the updated transportation scheme as selecting a transportation route with shelters, i.e., a transportation route with less direct sunlight, in response to the pressure fluctuation range exceeding the fluctuation threshold.

Figure 6:
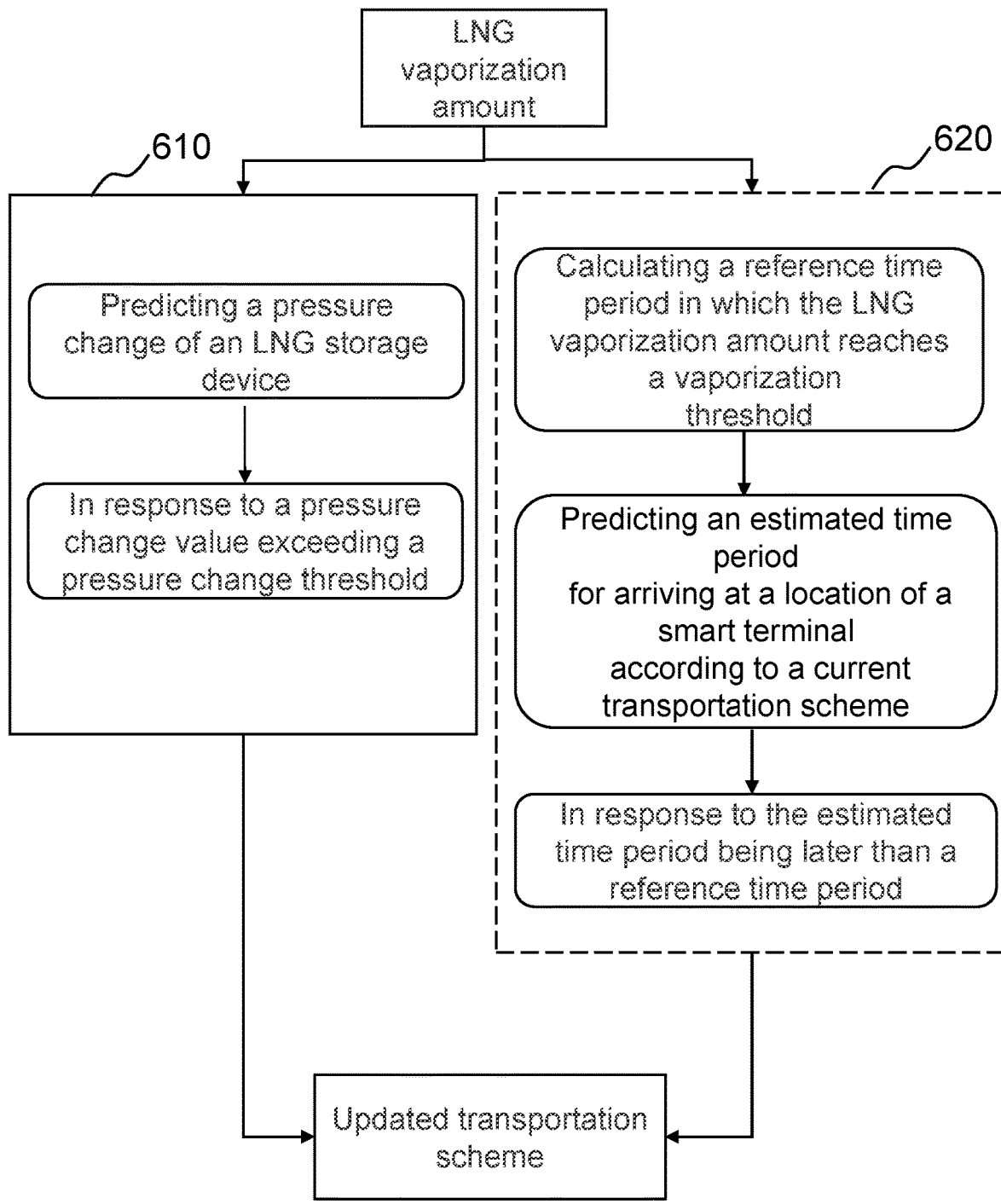
FIG. 6 is a schematic diagram illustrating an exemplary process for determining an updated transportation scheme according to some embodiments of the present disclosure.

Further descriptions regarding the updated transportation scheme may be found in FIG. 6 and the related description thereof.

In some embodiments of the present disclosure, determining the candidate transportation scheme through the LNG warehousing and transportation information and the LNG parameters, then determining the target transportation scheme, is beneficial to select a suitable warehousing station and transportation route according to an actual situation and realize LNG transportation deployment. The updated transportation route is determined based on the LNG vaporization situation, which may respond to changes in LNG during transportation in a timely manner and ensure safe LNG transportation.

Figure 4:
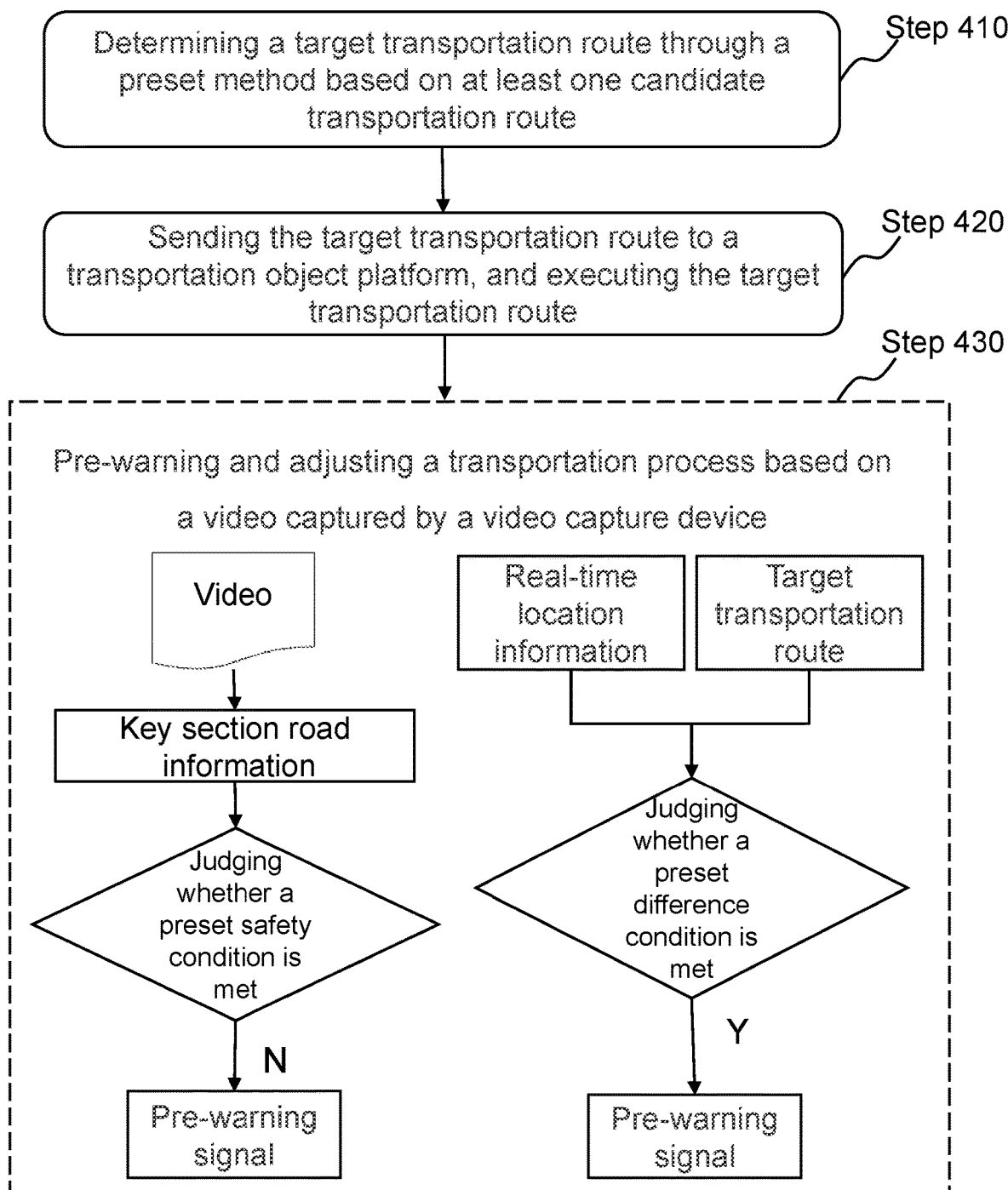
FIG. 4 is a schematic diagram illustrating an exemplary process for determining a target transportation scheme according to some embodiments of the present disclosure.

FIG. 4 is a schematic diagram illustrating an exemplary process for determining a target transportation scheme according to some embodiments of the present disclosure. As shown in FIG. 4, process 400 includes following steps. In some embodiments, the process 400 may be executed by a comprehensive management platform.

Step 410, determining a target transportation route through a preset manner based on at least one candidate transportation route.

The target transportation route refers to a candidate transportation route from a target warehousing station to a smart terminal, which is confirmed and selected from one or more candidate transportation routes.

In some embodiments, the preset manner may be manually preset and uploaded to the comprehensive management platform. In some embodiments, the comprehensive management platform may generate the preset manner based on a historical transportation situation.

The comprehensive management platform may determine the target transportation route through the preset manner based on a plurality of candidate transportation routes. In some embodiments, the preset manner may be taking a historically last-selected candidate transportation route as the target transportation route. In some embodiments, the preset manner may be to take a historically most-selected candidate transportation route as the target transportation route.

In some embodiments, the preset manner may also be to determine the target transportation route based on a route feature corresponding to at least one candidate transportation route.

The route feature refers to a feature relevant to the candidate transportation route. In some embodiments, the route feature includes at least one of a congestion situation and a collision risk of the candidate transportation route. In some embodiments, the route feature may be represented by a feature vector. For example, a vector $\vec{m}$ may be constructed as (a, b), wherein a denotes the congestion situation and b denotes the collision risk.

The congestion situation refers to a situation of road congestion on the candidate transportation route. In some embodiments, the congestion situation may be represented by a congestion level, and a higher congestion level indicates a more serious congestion situation.

In some embodiments, the congestion situation may be determined based on historical data. For example, a congestion situation of a road in a certain historical time period may be taken as a congestion situation of the road in a corresponding future time period.

The collision risk refers to a risk probability of a collision when a transportation vehicle is driving on the candidate transportation route. In some embodiments, the collision risk may be represented by a probability of a collision.

In some embodiments, the collision risk may be determined based on historical data. For example, a result of dividing a count of days of collision(s) on the candidate transportation route in a historical time period by a total count of days of the historical time period may be taken as the collision risk.

In some embodiments, the collision risk is also related to at least one of a vehicle flow, an average speed of the vehicle flow, and a count of key road sections.

The vehicle flow refers to a count of vehicles appearing in a road image at the current moment. The greater the vehicle flow, the higher the collision risk. In some embodiments, the comprehensive management platform may obtain the road image captured by a video capture device, and take the count of vehicles in the road image as the vehicle flow.

The average speed of the vehicle flow refers to an average driving speed of vehicles appearing in the road image at the current moment. The higher the average speed of the vehicle flow, the higher the collision risk. In some embodiments, the average speed of the vehicle flow may be obtained by calculation. Detailed descriptions regarding a calculation manner of the average speed of the vehicle flow may be found in FIG. 5 and related descriptions thereof.

The key road section refers to a key road section on the candidate transportation route, such as a fork in the candidate transportation route, a road section with a high incidence of accidents, etc. The greater the count of key road sections, and the greater the vehicle flow at the key road section, the higher the collision risk when the average speed of the vehicle flow is not 0.

In some embodiments, the comprehensive management platform may obtain key road section information corresponding to the candidate transportation route based on the candidate transportation route. The key section information may include the count of key road sections, a location of a key road section, etc., corresponding to the candidate transportation route.

In some embodiments, the comprehensive management platform may obtain the key road section information through image recognition based on video(s) captured by the video capture device. For example, a road in the video(s) may be identified based on an image recognition model, and then the key road section information may be determined based on road information.

The image recognition model may be a machine learning model, for example, a recurrent neural network (RNN) model, etc. An input of the image recognition model may include a plurality of frames of images in a video of a current road, and an output of the image recognition model may include current road information. The current road information may include a name of the current road, sections included in the current road, etc. The current road information may be represented by a feature vector. For example, a vector $\vec{n}$ may be constructed as (c, d), wherein c denotes the name of the current road, and d denotes the sections included in the current road.

The image recognition model may be obtained by training based on a plurality of first training samples with first labels. The first training samples are a plurality of frames of image samples in a video of a current road. The first training samples may be obtained from historical images. The first labels are current road information corresponding to the first training samples. The first labels may be obtained through road information stored in a database.

In some embodiments, based on the current road information output by the image recognition model, the comprehensive management platform may select a reference vector in a historical road information database with a closest vector distance to the current road information, and take the key section information corresponding to the reference vector as current key road section information. The reference vector may be road information in a certain historical period. The vector distance may be expressed based on a cosine distance, a Euclidean distance, or a Hamming distance.

Based on the vehicle flow, the average speed of the vehicle flow, and the count of key road sections, the collision risk may be determined more accurately to help to choose an appropriate transportation route to avoid traffic accidents.

The comprehensive management platform may determine the target transportation route based on the route feature. In some embodiments, the comprehensive management platform may determine the target transportation route based on historical data and the route feature. For example, through vector calculation, a historical route feature with a closest vector distance to the route feature is selected from the historical data, and the transportation route corresponding to the historical route feature is taken as the target transportation route.

In some embodiments, the comprehensive management platform may also determine the target transportation route through a preset manner.

In some embodiments, the preset manner may include: from the candidate transportation routes, selecting a plurality of candidate transportation routes whose collision risks are lower than a preset threshold; selecting a candidate transportation route with the lowest congestion level from the plurality of candidate transportation routes whose collision risks are lower than the preset threshold as the target transportation route. The preset threshold may be manually preset or determined by the comprehensive management platform based on historical data.

In some embodiments, the preset manner may further include: scoring each route feature of the candidate transportation route; performing a weighted summation based on the score, and taking the candidate transportation route whose weighted summation result meets a preset scoring condition as the target transportation route.

The comprehensive management platform may score each route feature of the candidate transportation route based on various ways. For example, the comprehensive management platform may score based on a traffic condition of the candidate transportation route. Exemplarily, for a candidate transportation route with a higher congestion level, the comprehensive management platform may set a lower score for the congestion situation; and for a candidate transportation route with a higher collision risk, the comprehensive management platform may set a lower score for collision risk.

The preset scoring condition refers to a scoring condition that needs to be met when the candidate transportation route is taken as the target transportation route. In some embodiments, the preset scoring condition may be manually preset. In some embodiments, the preset scoring condition may also be obtained by the comprehensive management platform based on historical data. For example, an average score corresponding to a plurality of historical target transportation routes may be taken as a score of the preset scoring condition.

In some embodiments, the comprehensive management platform may set weights for each route feature based on the traffic condition of the candidate transportation route, and determine a score by performing a weighted summation calculation, so as to determine the target transportation route based on the score. Exemplarily, this process is shown in the following steps S1-S3.

Step S1: scoring each route feature of the candidate transportation route, and presetting a corresponding relationship between the each route feature and the score in advance. For example, based on a corresponding relationship, a score of a route feature 1 is determined as three, a score of a route feature 2 is determined as six, and a score of a route feature 3 is determined as nine.

Step S2: performing a weighted summation calculation on the score of the each route feature, wherein a weight of the each route feature is preset. For example, weights of route features 1, 2, and 3 of a candidate transportation route A may be (30%, 40%, 30%), and a final score of the candidate transportation route A after a weighted summation is 6 (3×30%+6×40%+9×30%).

Step S3: taking a candidate transportation route with a highest score as the target transportation route. For example, the comprehensive management platform may compare the score of the candidate transportation route A with scores of other candidate transportation routes, and take a candidate transportation route with the highest score as the target transportation route.

Scoring the route feature of the candidate transportation route can quantitatively analyze and determine the target transportation route based on scoring results, making the determination of the target transportation route more reasonable and ensuring safety of the target transportation route.

Determining the target transportation route based on the congestion situation and the collision risk of the candidate transportation route may ensure the safety of the target transportation route and avoid congestion as much as possible, thereby enabling the transportation vehicle to reach the location of the smart terminal safely and timely.

Step 420, sending the target transportation route to a transportation object platform, and executing the target transportation route.

In some embodiments, the comprehensive management platform may send the target transportation route to the transportation object platform. For example, the target transportation route may be sent to a vehicle-mounted terminal or a transportation personnel terminal for display. Furthermore, the target transportation route may also be navigated based on a smart electronic map.

In some embodiments, the transportation personnel may drive the transportation vehicle along a received target transportation route to the smart terminal.

Step 430, pre-warning and adjusting the transportation process based on the video captured by the video capture device.

The video capture device refers to a device for collecting videos of vehicle flows on a road.

The video captured by the video capture device refers to a video reflecting the vehicle flow on the road.

In some embodiments, the comprehensive management platform may perform a pre-warning and adjustment on the transportation process based on the video captured by the video capture device. For example, when the video shows that the transportation vehicle has a violation, a warning may be issued to the transportation personnel and a pre-warning may be issued in a next similar violation.

In some embodiments, the comprehensive management platform may also determine key section road information of the candidate transportation route based on the video captured by the video capture device; in response to the key section road information not meeting a preset safety condition, issue a pre-warning signal to the transportation object platform, and updating the target transportation route; or based on a comparison between real-time location information and the target transportation route, in response to a comparison result meeting a preset difference condition, send the pre-warning signal to the transportation object platform.

The key section road information may include a count of speeding vehicles and the average speed of vehicle flow.

The count of speeding vehicles refers to a count of speeding vehicles appearing in the key road section at the current moment. Detailed descriptions regarding the average speed of the vehicle flow may be found in the related descriptions hereinabove.

In some embodiments, the comprehensive management platform may obtain the count of speeding vehicles and the average speed of the vehicle flow in real time through the video captured by the video capture device.

In some embodiments, the comprehensive management platform may also count the speeding vehicles and calculate the average speed of the vehicle flow when the speed of the transportation vehicle meets a preset speed condition.

The preset speed condition may include: counting the speeding vehicles, and calculating the average speed of the vehicle flow when the speed of the transportation vehicle exceeds a speed threshold.

The speed threshold is related to a mass of the transportation vehicle, carrier components of the transportation vehicle, etc. In some embodiments, the speed threshold may be manually preset, or set according to historical data.

The greater the mass of the transportation vehicle, the greater the inertia of the vehicle and the smaller the speed threshold may be set. The greater the sensitivity of the carrier components of the transportation vehicle to bumps and vehicle speed, the smaller the speed threshold may be set.

Determining the speed threshold based on the mass of the transportation vehicle and the carrier components may avoid dangers caused by untimely braking and violent reaction of the carrier caused by an excessive vehicle speed.

In some embodiments, the count of speeding vehicles may be obtained through a vehicle identification model.

The vehicle identification model may include an object identification layer and a vehicle feature determination layer. In some embodiments, the object identification layer may be a You Only Look Once (YOLO) model, and the vehicle feature determination layer may be a Convolutional Neural Network (CNN) model. The vehicle feature determination layer may also be a machine learning model with other structures, for example, a combined structure of a convolutional neural network and a deep neural network.

An input of the vehicle identification model may be an input of the object identification layer. An output of the vehicle identification model may be an output of the vehicle feature determination layer.

The input of the object identification layer may be two frames of vehicle flow images, and the output may be a plurality of object boxes and a classification of each of the object boxes. The two frames of the vehicle flow images refer to vehicle flow images at two time points (e.g., T1 and T2 time points). It should be noted that a time interval between the two time points is small enough, that is, ensuring that the same vehicle appears in the two frames of vehicle flow images. At the same time, there are no other vehicles of the same type in the two frames of the vehicle flow images. The object box is used to identify categories of objects in the vehicle flow image. For example, the object box may include an object box corresponding to a vehicle, an object box corresponding to a pedestrian, etc.

The input of the vehicle feature determination layer may be the object box corresponding to the vehicle, and the output may be vehicle features of the object box. The vehicle features may include a vehicle type, a body cleanliness degree, body colors, and other features sufficient to distinguish different vehicles. The vehicle features may be represented by a vector.

The vehicle identification model may be obtained based on joint training of the object identification layer and the vehicle feature determination layer. A second training sample for the joint training may be obtained based on historical images. A second training sample includes two frames of vehicle flow image samples. A second label may represent the vehicle features of the object box in the second training sample. Labels may be obtained from historical identification results of the historical images.

In some embodiments, the second training sample is input into the object identification layer in the vehicle identification model, and the object box corresponding to the vehicle is input into the vehicle feature determination layer in the vehicle identification model. A loss function is constructed based on the output and labels of the vehicle feature determination layer, and at the same time, parameters of the object identification layer and the vehicle feature determination layer are iteratively updated based on the loss function. Until preset conditions are met, the training is completed. After the training is completed, the parameters of the object identification layer in the vehicle identification model may also be determined. Obtaining the parameters of the object identification layer through the above training process is helpful in some cases to solve the problem of difficulty in obtaining labels when training the object identification layer alone.

In some embodiments, the comprehensive management platform may determine the same vehicle based on the vehicle features output by the vehicle identification model. For example, the comprehensive management platform may calculate a similarity between vehicle features of a plurality of object boxes in two frames of vehicle flow images, and take the vehicle in two object boxes with a highest similarity and exceeding a preset threshold as the same vehicle. The comprehensive management platform may determine the speeding vehicles based on matching results of the same vehicle, and then obtain the count of speeding vehicles. The speeding vehicle may be a vehicle that appears in one frame of the vehicle flow image but is not matched in another frame of the vehicle flow image.

In some embodiments, the average speed of the vehicle flow may be obtained through the following process: among the same vehicles, selecting a certain time period (e.g., a time period of $T_1$-$T_2$), and taking the transportation vehicle as a reference, determining a vehicle A with a largest moving distance and a vehicle B with a smallest moving distance; based on a speed $V_C$ and moving distances $S_A$ and $S_B$ of the transportation vehicle C, calculate an average speed $V_A$ of the vehicle A as $(S_A(T_2-T_1)+V_C)$ and an average speed $V_B$ of the vehicle B as $(V_C-S_A \div (T_2-T_1))$ during the time period; and based on the speed $V_C$ of the transportation vehicle, the average speed $V_A$ of the vehicle A, and the average speed $V_B$ of the vehicle B, calculate the average speed of the traffic flow as $((V_A+V_B+V_C) \div 3)$.

Determining the average speed of the vehicle flow based on transportation speeds of different vehicles can reflect a vehicle speed around the transportation vehicle more accurately, and then the risk degree of the driving environment of the transportation vehicle can be accurately determined.

When the speed of the transportation vehicle exceeds the preset speed condition, counting the speeding vehicles and calculating the average speed of the vehicle flow as road information can ensure the validity of obtained road information and avoid redundancy of data.

In some embodiments, in response to the key road section information not meeting the preset safety condition, the comprehensive management platform may send a pre-warning signal to the transportation object platform and update the target transportation route.

In some embodiments, when the speed of the transportation vehicle does not exceed the speed threshold, the preset safety condition is that the vehicle flow does not exceed the vehicle flow threshold; when the speed of the transportation vehicle exceeds the speed threshold, the preset safety condition is that the vehicle flow, the count of speeding vehicles, and the average speed of the vehicle flow do not exceed corresponding thresholds.

The above thresholds may be manually preset or obtained by the comprehensive management platform based on historical vehicle flow conditions of corresponding key road sections, which is not limited in the present disclosure.

Determining the preset safety condition in different situations based on the speed of the transportation vehicle can make the setting of the preset safety condition more in line with an actual transportation environment of the transportation vehicle, thereby avoiding unnecessary or untimely adjustment of the transportation scheme.

The pre-warning signal may include a flashing light signal, a text signal, a voice signal, and other signals that may be received and processed by the transportation object platform.

In some embodiments, in response to the key road section information not meeting the preset safety condition, the comprehensive management platform may send different pre-warning signals to the transportation object platform. For example, when the speed of the transportation vehicle does not exceed the speed threshold, the comprehensive management platform may issue a mild warning signal such as the text signal.

In some embodiments, in response to the key road section information not meeting the preset safety condition, the comprehensive management platform may update the target transportation route. For example, the comprehensive management platform may reselect the target transportation route from the candidate transportation routes.

In some embodiments, the comprehensive management platform may compare the real-time location information with the target transportation route, and send the pre-warning signal to the transportation object platform in response to a comparison result meeting the preset difference condition.

The real-time location information refers to real-time location information of the transportation vehicle.

The preset difference condition refers to a preset condition reflecting the difference between the real-time location information and the target transportation route. For example, the difference between the real-time location information and the target transportation route may be a deviation degree between them, and correspondingly, the preset difference condition may be that a deviation degree is greater than a deviation threshold, etc.

In some embodiments, the comprehensive management platform may send the pre-warning signal based on the preset difference condition. For example, in response to meeting a duration of the preset difference condition exceeding a threshold, the comprehensive management platform may issue a severe warning signal such as the voice signal.

Based on the video captured by the video capture device, the comprehensive management platform may obtain effective information related to the transportation environment of the transportation vehicle, and then accurately and timely perform pre-warning and adjustment in the transportation process.

In some embodiments of the present disclosure, the target transportation route is determined and executed based on the candidate transportation route through a preset manner, and an optimal transportation route may be determined according to the actual road information of the transportation route, at the same time, based on the video captured by the video capture device, the transportation route can be adjusted reasonably and timely according to an actual transportation situation of the transportation vehicle to ensure the normal LNG transportation.

Figure 5:
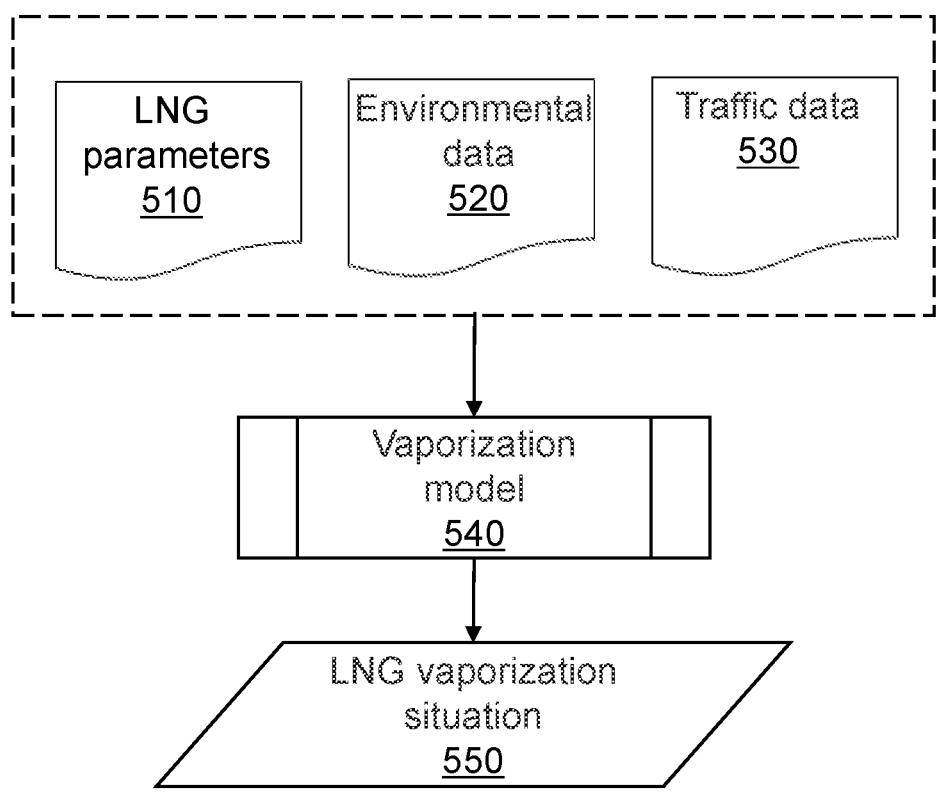
FIG. 5 is a schematic diagram illustrating an exemplary vaporization model according to some embodiments of the present disclosure.

FIG. 5 is a schematic diagram illustrating an exemplary vaporization model according to some embodiments of the present disclosure.

The vaporization model refers to a model for determining an LNG vaporization situation. The vaporization model may be a Convolutional Neural Network (CNN) model. The vaporization model may also be a machine learning model with other structures, such as an RNN model.

As shown in FIG. 5, an input of the vaporization model 540 may include LNG parameters 510, environmental data 520, and traffic data 530, and an output of the vaporization model 540 may include an LNG vaporization situation 550. In some embodiments, the LNG vaporization situation 550 may include a predicted accumulated LNG vaporization amount of at least one future time point. Descriptions regarding the LNG parameters, the environmental data, the traffic data, the LNG vaporization situation, and the accumulated vaporization amount may be found in FIG. 3 and related descriptions thereof.

The vaporization model 540 may be obtained through a plurality of third training samples with third labels. Third training samples may include LNG historical parameters, historical environmental data, and historical traffic data. Third labels may include an actual accumulated vaporization amount at a historical time point corresponding to the at least one future time point.

In some embodiments of the present disclosure, using the vaporization model can make the prediction of the LNG vaporization situation more accurate, reduce computational workload during manual prediction, and improve a prediction speed.

FIG. 6 is a schematic diagram illustrating an exemplary process for determining an updated transportation scheme according to some embodiments of the present disclosure. In some embodiments, process 600 may be executed by a comprehensive management platform.

As shown in process box 610, based on an LNG vaporization amount, a pressure change of an LNG storage device is predicted; and in response to a pressure change value exceeding a pressure change threshold, an updated transportation scheme is determined. Further description regarding the LNG vaporization amount may be found in FIG. 3 and the related description thereof.

The pressure change refers to a pressure change during LNG transportation. For example, the pressure change may include a pressure change value, etc.

In some embodiments, the comprehensive management platform may use any feasible algorithm (e.g., an ideal gas state equation) to predict the pressure change of the LNG storage device. In some embodiments, the comprehensive management platform may also use the vaporization model 540 shown in FIG. 5 to predict the pressure change. For example, a pressure value of at least one future time point may be obtained through an output of the vaporization model 540.

In some embodiments, the pressure change threshold may be determined based on a safety requirement for LNG transportation. In some embodiments, the pressure change threshold may also be determined based on the LNG pressure during historical transportation. For example, a maximum pressure change value in a historically safe transportation process may be determined as the pressure change threshold.

In some embodiments, the comprehensive management platform may determine to update the transportation scheme in response to the pressure change value exceeding the pressure change threshold. For example, in response to the pressure change value slightly exceeding the pressure change threshold, an updated transportation scheme may be determined as selecting a transportation route with a lower passenger flow. As another example, when the pressure change value seriously exceeds the pressure change threshold, the updated transportation scheme may be determined as selecting an open area for processing such as pressure relief, etc.

Descriptions regarding the LNG vaporization amount and the updated transportation scheme may be found in FIG. 3 and the related description thereof.

Determining the updated transportation scheme based on the pressure change can avoid excessive pressure in the LNG storage device and ensure transportation safety.

As shown in process box 620, a reference time period in which the LNG vaporization amount reaches a vaporization threshold is calculated; an estimated time period for arriving at the location of the smart terminal is predicted according to a current transportation scheme; and in response to the estimated time period being later than the reference time period, the updated transportation scheme is determined based on updated environment data and traffic data.

In some embodiments, the vaporization threshold may be determined based on an LNG safe transportation standard. For example, pressure corresponding to the vaporization threshold may not exceed the maximum pressure for safe LNG transportation. In some embodiments, the vaporization threshold may also be determined based on revenue and costs of LNG supply. For example, the determination of the vaporization threshold should meet the requirement that the revenue of LNG supply completely covers the costs of gas supply and the loss of vaporization, etc.

The reference time period refers to a time period corresponding to the time from the current moment to the moment when the LNG vaporization amount reaches the vaporization threshold.

The comprehensive management platform may calculate the reference time period when the LNG vaporization amount reaches the vaporization threshold. In some embodiments, the comprehensive management platform may predict a moment when the LNG vaporization amount reaches the vaporization threshold through a feasible algorithm (e.g., a vaporization model, etc.) based on current LNG vaporization amount, and then determine the reference time period. In some embodiments, the comprehensive management platform may also determine the reference time period based on a historical LNG vaporization amount. For example, in a plurality of historical transportation processes with the same LNG transportation amount as a current LNG transportation amount, a plurality of time periods when the LNG vaporization amount reaches the vaporization threshold may be counted, and the average time length corresponding to the plurality of time periods may be determined as a time length for the reference time period.

The estimated time period refers to a time period when arriving at the location of the smart terminal from the current moment. The comprehensive management platform may predict the estimated time period when arriving at the location of the smart terminal according to a current transportation scheme. In some embodiments, the comprehensive management platform may calculate the estimated time period when arriving at the location of the smart terminal based on a current average speed of a transportation vehicle, and then determine the estimated time period. In some embodiments, the comprehensive management platform may further predict the estimated time period when arriving at the location of the smart terminal according to the current transportation scheme through a prediction model based on a transportation route feature of the current transportation scheme.

The updated environmental data and traffic data refer to environmental data and traffic data of the current transportation scheme executed to the current moment. In some embodiments, the comprehensive management platform may determine new environmental data and traffic data based on data such as Internet data, real-time traffic images, etc.

In some embodiments, in response to the estimated time period being later than the reference time period, the comprehensive management platform may determine the updated transportation scheme based on the updated environment data and traffic data. For example, the comprehensive management platform may take the transportation scheme that meets the transportation scheme requirements as an updated transportation scheme.

In some embodiments, the comprehensive management platform may determine at least one candidate updated scheme, and then determine an updated transportation scheme based on the at least one candidate updated scheme.

A candidate updated scheme refers to an optional transportation scheme for transporting LNG from the current location to the location of the smart terminal.

Detailed descriptions regarding determining the candidate updated scheme, may be found in the related descriptions of determining the candidate transportation scheme in step 320.

Detailed descriptions regarding determining the updated transportation scheme may be found in the related description of determining the target transportation scheme in step 330.

Based on the at least one candidate updated scheme, an optimal candidate updated scheme is selected as the updated transportation scheme, which may reasonably deploy the transportation scheme while meeting the transportation scheme requirements.

In some embodiments, determining the updated transportation scheme further includes: based on the updated environment data and traffic data, judging whether the updated transportation scheme meets a preset update condition by using the vaporization model.

In some embodiments, the comprehensive management platform may use the vaporization model to re-predict the LNG vaporization situation based on the updated environmental data and traffic data, and take the LNG vaporization situation output by the vaporization model as a basis for determining the updated transportation scheme. By judging whether the LNG vaporization situation meets the preset update condition, the updated transportation scheme is determined when the preset update condition is met.

Descriptions regarding the preset update condition may be found in FIG. 3 and related descriptions thereof. Further description regarding the vaporization model may be found in FIG. 5 and the related description thereof.

Using updated environmental data and traffic data can ensure the data is timely and valid, and then an actual transportation situation at the current moment can be predicted accurately.

In some embodiments, the updated transportation scheme further includes: determining a target processing location for processing LNG. The process for processing LNG may include: arriving at a target processing location before a pressure gauge reading is close to a discharge value of a safety valve, opening a vent valve for gas discharge and pressure relief, and avoiding white mist formed by cold gas from affecting the safety of other vehicles or people during pressure relief.

The target processing location includes any location suitable for processing LNG with short driving time, as well as the vehicle flow, the passenger flow, and the count of surrounding buildings that are lower than a preset value, etc. For example, the target processing location may be a location with passenger flow lower than ten people per hour and surrounding buildings less than three.

When there is no updated transportation scheme that meets the preset update condition, the comprehensive management platform may determine at least one candidate processing location, and determine the target processing location therefrom. In some embodiments, in response to a fact that there is no updated transportation scheme that meets the condition (other routes are time-consuming, or the traffic is congested or the road conditions are worse, etc.), or the pressure in the LNG storage device reaches a level that must be dealt with in time, the comprehensive management platform may determine a relatively suitable processing location (e.g., relatively easy to reach, with a relatively low vehicle flow, with a relatively low passenger flow, with few buildings, remote, etc.). For example, the comprehensive management platform may determine the candidate processing location with the shortest arrival time or the least route passenger flow from at least one candidate location as the target processing location based on the distance between the current location and the candidate processing location, and based on the traffic data of a route to the candidate processing location. Further descriptions regarding determining the target processing location may be found in FIG. 3 and FIG. 4 and related descriptions thereof.

Determining the target processing location may ensure the safety of the LNG transportation process when there is no appropriate updated transportation scheme.

Based on the estimated time period and the reference time period, an updated transportation scheme that minimizes the impact on LNG transportation may be selected, and the transportation scheme can be adjusted in time according to the actual transportation situation to ensure transportation safety.

In some embodiments of the present disclosure, when the pressure in the LNG storage device reaches a higher value due to a high LNG vaporization amount, there may be a greater risk due to different aging degrees of different parts of a transportation device and the storage device, and there may be a higher risk coefficient in places with higher vehicle flow, higher passenger flow, or dense buildings. Therefore, in some embodiments of the present disclosure, predicting the change situation of the LNG vaporization amount in the storage device in advance, determining the updated transportation scheme in advance when a predicted vaporization amount reaches the threshold, or determining the LNG processing location, may reduce the risk of LNG transportation accidents (such as explosions) to a certain extent.

In addition to LNG, liquid hydrogen, as another high-energy liquid fuel, may effectively solve the problem of long-distance and large-scale transportation and trade of energy, also has a wide range of application scenarios. As a cryogenic liquid fuel, liquid hydrogen has warehousing and transportation features similar to LNG. Taking LNG as the main object, the contents such as the determination of the transportation scheme, pre-warning, and adjustment of the transportation process of cryogenic liquid fuel are described above. The above contents may also be applied to warehousing and transportation of liquid hydrogen.

Having thus described the basic concepts, it may be rather apparent to those skilled in the art that the foregoing detailed disclosure is intended to be presented by way of example only and is not limiting. Although not explicitly stated here, those skilled in the art may make various modifications, improvements, and amendments to the present disclosure. These modifications, improvements, and amendments are intended to be suggested by the present disclosure and are within the spirit and scope of the exemplary embodiments of the present disclosure.

Some features, structures, or characteristics of one or more embodiments in the present disclosure may be properly combined

What is claimed is:

1. A method for liquefied natural gas (LNG) management linked with warehousing, transportation, and a smart terminal, wherein the method comprises:
   step 1: collecting data including LNG warehousing data, transportation data, and smart terminal data, and transmitting the data to a management platform through a communication network;
   step 2: storing all received data in a corresponding server database after preprocessing, and managing the server database through a virtualization technology by the management platform;
   step 201: classifying the data and setting classification marks when the management platform receives the data, wherein the data is classified into perception information and control information, and the perception information includes warehousing perception information, transportation vehicle perception information, and smart terminal perception information;
   step 202: storing classified data in a cache, storing the classified data in a master database, and obtaining a geographical location information mark included in the classified data of the cache at a same time, and storing the classified data regionally in different server slave databases according to a regional division of operators; and
   step 203: reading real-time data from the cache, analyzing the real-time data, and then building a virtual pipeline network on a map by the management platform with an LNG warehousing station as a starting node, the smart terminal as a terminal node, and a transportation route of a transportation vehicle as an edge;
   step 3: monitoring an LNG usage situation, a warehousing situation, and a transportation situation in real-time through the management platform, and displaying information corresponding to a user permission in a user platform; and
   step 4: sending control information of LNG usage requirements, fee payments, procurement management, and transportation deployment by users through the user platform, and sending the control information to the warehousing station, the transportation vehicle, and the smart terminal through the management platform to realize real-time LNG management;
   step 5: obtaining LNG warehousing and transportation information and LNG parameters;
   determining at least one candidate transportation scheme based on the LNG warehousing and transportation information and the LNG parameters, wherein the candidate transportation scheme includes a location of the warehousing station for supplying LNG, a required LNG transportation amount, an LNG transportation time, a location of the smart terminal, and at least one candidate transportation route;
   determining a target transportation scheme based on the at least one candidate transportation scheme;
   combining the LNG parameters, environmental data, and traffic data to predict an LNG vaporization situation based on a vaporization model, wherein the LNG vaporization situation includes an LNG vaporization speed, a volume ratio of a vaporized part to a remaining LNG, a gas pressure, an LNG vaporization amount of at least one future time point, and the vaporization model is a machine learning model;
   predicting a pressure change value of an LNG storage device based on the LNG vaporization amount of at least one future time point; and
   in response to the pressure change value exceeding a pressure change threshold, determining an updated transportation scheme.

2. The method according to claim 1, wherein the monitoring an LNG usage situation in real-time includes: uploading LNG storage information, usage information, device operation status information, and safety information through an information system loaded inside the smart terminal.

3. The method according to claim 1, wherein the user platform includes resident users, small and micro-enterprise users, and operator users.

4. An Internet of Things system for liquefied natural gas (LNG) management linked with warehousing, transportation, and a smart terminal, applying the method according to claim 1, wherein the Internet of Things system comprises a user platform, a service platform, a comprehensive management platform, a plurality of sensor network platforms, and a plurality of object platforms; the user platform, the service platform, the comprehensive management platform, the plurality of sensor network platforms, and the plurality of object platforms are sequentially connected by communication; the sensor network platforms include warehousing sensor network platforms, transportation sensor network platforms, and smart terminal sensor network platforms; the object platforms include warehousing object platforms, transportation object platforms, and smart terminal object platforms;
   the user platform is configured for various types of users to obtain perception information of user requirements through a user terminal, and to send control information through the user terminal;

the service platform is a service platform server, which communicates and connects different user platforms and the management platform through a service communication network, and provides data analysis and storage services for the user platforms and the management platform;

the management platform is configured for unified management of the LNG warehousing, the transportation, and the smart terminal, generating a virtual pipeline network by integrating LNG warehousing data, transportation data, and smart terminal data, realizing dynamic unified management on smart monitoring, deployment, and consumption of LNG energy;

each of the sensor network platforms includes a physical entity corresponding to the each sensor network and a sensor communication information system, and communication data is analyzed and processed through the sensor communication information system; and each of the object platforms is composed of an object physical entity and an object information system; control and perception are realized through an operation of the object information system on the object physical entity.

5. The Internet of Things system according to claim 4, wherein the perception information of user requirements includes an LNG usage amount, a fee, a delivery status, a business reminder, and safety warning information.

6. The Internet of Things system according to claim 4, wherein the service platform includes a perception information service sub-platform and a control information service sub-platform; the service platform analyzes and stores the perception information of user requirements obtained from the management platform through a perception information service system, and the perception information of user requirements is actively provided to users according to a type of the perception information or extracted by the users at any time according to the user requirements; the service platform receives control information of usage amount inquiries, usage requirements, and recharge payments issued by the users, and sends the control information to the management platform after being processed by a control information service system.

7. The Internet of Things system according to claim 4, wherein the management platform includes a warehousing management sub-system, a transportation management sub-system, a smart terminal management sub-system, a financial management sub-system, and a procurement management sub-system.

8. The Internet of Things system according to claim 4, wherein the warehousing object platforms include a smart warehousing device that obtains and uploads the storage perception information through an information system loaded inside and executes warehousing control instructions of the management platform; physical entities of the transportation object platforms are LNG transportation vehicles and transportation personnel, and transportation work deployment of the management platform is executed by uploading transportation work status information and location information; physical entities of the smart terminal object platforms are smart devices with functions of storage, vaporization, and metering at an end of the LNG virtual pipeline network, the smart devices upload the LNG storage information, the usage information, the device operation status information, and the safety information through an information system loaded inside, and execute control instructions of the management platform.

* * * * *